(12) United States Patent
Frommer et al.

(10) Patent No.: US 7,889,629 B2
(45) Date of Patent: *Feb. 15, 2011

(54) HIGH DENSITY DATA STORAGE MEDIUM

(75) Inventors: Jane Frommer, San Jose, CA (US); Robert D. Miller, San Jose, CA (US); Craig Hawker, Los Gato, CA (US); Urs T. Duerig, Ruschlikon (CH); Bernd Gotsmann, Horgen (CH); Peter Vettiger, Langnau Am Albis (CH); Mark A. Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/275,547

(22) Filed: Nov. 21, 2008

(65) Prior Publication Data

US 2009/0073849 A1    Mar. 19, 2009

Related U.S. Application Data

(63) Continuation of application No. 10/652,421, filed on Aug. 29, 2003, now Pat. No. 7,463,572.

(51) Int. Cl.
*G11B 9/00* (2006.01)
(52) U.S. Cl. .................................... 369/126
(58) Field of Classification Search ................. None
See application file for complete search history.

(56) References Cited

U.S. PATENT DOCUMENTS 5,426,086 A    6/1995    Hotta et al.
5,641,856 A    6/1997    Meurs et al.
6,136,751 A    10/2000   Harada
6,271,335 B1   8/2001    Small et al.
6,410,479 B1   6/2002    Fukuchi et al.
6,803,447 B2   10/2004   Janssen et al.
6,899,992 B2   5/2005    Huang et al.
6,927,097 B2   8/2005    Dunlap
6,974,917 B2   12/2005   Hattori et al.

(Continued)

FOREIGN PATENT DOCUMENTS

EP    0 425 814 A1    8/1991

OTHER PUBLICATIONS

P. Vettiger et al.; "The Millipede"—More than one thousand tips for future AFM data storage, IBM Journal of Research & Development, May 2000, p. 323-340, vol. 44, No. 3, USA.

(Continued)

*Primary Examiner*—Daniell L Negrón
*Assistant Examiner*—Parul Gupta
(74) *Attorney, Agent, or Firm*—Cantor Colburn LLP

(57) ABSTRACT

A data storage system includes a read/write head having a tip connected to a resistive path locally exerting heat at the tip when an electrical current is applied; and a data storage medium from which information is reproduced by scanning a surface of the medium with a tip positioned in contact therewith, the medium comprising: a substrate; and a polymer recording surface within which data bit values are determined by the topographical state at the bit location, characterized in that the polymer contains thermally reversible crosslinkages.

16 Claims, 4 Drawing Sheets

U.S. PATENT DOCUMENTS 7,426,174 B2 9/2008 Terao et al.
2009/0011253 A1* 1/2009 Duerig et al. ............... 428/446

OTHER PUBLICATIONS

P. Vettiger et al.; "The Millipede"—Nanotechnology Entering Data Storage, IEEE Transactions on Nanotechnology, Mar. 2002, p. 39-55, vol. 1, No. 1, USA.

X. Chen et al.; "New Thermally Remendable Highly Cross-Linked Polymeric Materials;" Macromolecules, Feb. 2003, p. 1802-1807, vol. 36, USA.

P. Vettiger et al.; "The Nanodrive Project;" Scientific American, Jan. 2003, p. 47-53, USA.

R. Silbey et al.; "Macromolecules," Physical Chemistry (Third Edition), 2001, p. 779-862, USA.

* cited by examiner

HIGH DENSITY DATA STORAGE MEDIUM

CROSS-REFERENCE TO RELATED APPLICATION

This application is a continuation of U.S. patent application Ser. No. 10/652,421, filed Aug. 29, 2003, the disclosure of which is incorporated by reference herein in its entirety.

FIELD OF THE INVENTION

The present invention relates generally to probe-based, and in particular AFM (Atomic Force Microscope)-based data storage systems. In particular it relates to the ultra high density data storage systems of the type which have a tip directed in contact with the storage medium by which bit-writing and bit-reading are carried out. More particularly the present invention relates to a data storage medium from which information is reproduced by scanning a surface of the medium with a tip positioned in contact therewith, the medium comprising a substrate; and a polymer recording surface within which data bit values are determined by the topographical state at the bit location.

BACKGROUND OF THE INVENTION

The Atomic Force Microscope is a well-known device in which the topography of a sample is sensed by a tip mounted on the end of a microfabricated cantilever. As the sample is scanned, the interaction of atomic forces between the tip and the sample surface causes pivotal deflection of the cantilever. The sample topography is determined by detecting this deflection.

The AFM technology has also been applied to the field of data storage with a view to providing a new generation of high-density, high data-rate data storage devices for mass-memory applications. AFM-based data storage is described in detail in IEEE Transactions on Nanotechnology, Volume 1, number 1, pages 39 to 55, Vettinger et al., and in IBM Journal of Research & Development, Volume 44, No. 3, May 2000, pp 323-340, "The 'Millipede'—More Than One Thousand Tips for Future AFM Data Storage", Vettinger et al., and the references cited therein.

The cantilever-mounted tip, referred to as the read/write tip, is used for reading and writing of data on the surface of a data storage medium. In operation, the read/write tip is biased against the surface of the data storage medium. The storage medium generally comprises a polymeric material.

In the write mode, the read/write tip is heated which results in heat transfer to the polymer surface layer causing local softening of the polymer. This allows the tip to penetrate the surface layer to form a pit, or bit indentation; such a pit represents a bit of value "1", a bit of value "0" being represented by the absence of a pit. This technique is referred to as thermomechanical writing. In an alternative system disclosed in U.S. Pat. No. 5,446,720 in the name of Canon Kabushiki Kaisha the value "0" is represented by pit representing a tracking bit and the value "1" by a pit representing an information bit, the depth of the tracking pit being significantly less than that of an information pit.

The storage medium can be moved relative to the read/write component tip allowing the tip to write data over an area of the surface, or "storage field", corresponding to the field of movement. Each indentation is created by heating the cantilever tip and with the application of force pressing this tip into the polymer film. The tip is heated by passing a current through a resistive heater integrated in the cantilever, directly behind the tip. Some of the heat generated in the resistor is conducted through the tip and into the polymer film, locally heating a small volume of the polymer. If sufficient heat is transferred to raise the temperature of the polymer above a certain temperature (which is dependent on the chosen polymer), the polymer softens and the tip sinks in, creating an indentation or bit.

In the read mode, the storage field is scanned by the tip, the position of the tip and the cantilever on which it is mounted differs according to the presence or absence of a pit. The reading operation uses thermomechanical sensing based on the principle that the thermal conductance between the cantilever, and components attached thereto, and the storage substrate, changes according to the distance between them; the distance is reduced as the tip moves into a bit indentation. Further discussion of the reading operation can be found in the above identified IBM Journal of Research & Development article.

The early storage medium consisted of a bulk polycarbonate layer. The IBM Journal of Research & Development and IEEE Transaction on Nanotechnology articles disclose an improved storage medium comprising a silicon substrate having a very thin layer of polymer thereon. The preferred storage medium comprises a silicon substrate having a thin layer of polymethylmethacrylate (PMMA) as the read/write layer. The advantage of having a silicon substrate is that the hard silicon substrate limits the penetration of the tip and also, because silicon is a better conductor of heat than polymers such as PMMA, there is improved transport of heat away from the pits during the reading and writing processes. The PMMA layer is suitably about 40 nm thick thus giving a depth of pit of up to 40 nm. Problems of tip wear are believed to be caused by the tip penetrating the polymer layer and making contact with the hard silicon substrate, and in a further improved storage medium, a layer of crosslinked photoresist, in this example SU8 resin from MicroChem Corporation, Newton, Mass., USA, was introduced between the PMMA and the silicon substrate. The layer of crosslinked resin, typically about 70 nm thickness, acts as a softer penetration stop thereby reducing tip wear.

A data storage device will include the data storage medium described herein. In a multi-cantilever/tip device such as described in the Vettinger paper, above, multiple simultaneous operations can be carried on in a common polymer substrate by individually addressing each bit location. By virtue of the nanometer length-scale of each operation, this array of multiple bit locations in sum occupies a minimum amount of space constituting an ultrahigh density 'reactor'. Data are stored by making nanoscopic indentations in a thin polymer film using a highly parallel array of cantilevers. As described above, at each position, an indentation or pit represents a 1 and no indentation or pit represents a 0, therefore data can be stored in a traditional binary sense via the presence or absence of nanoscopic indentations in the thin polymer film which serves as the storage medium.

The efficiency of writing and reading the indentations (bits of information) is therefore critically dependent on the nature of the polymeric thin film. Desirable attributes of the polymeric thin film are 'softness' and deformability during the writing phase, toughness and resistance to wear during the reading phase, and long term stability over the lifetime of the stored data. A hard polymer with a high melting point will be difficult to soften sufficiently for the tip to sink in and form the pit during the writing process. Conversely a hard polymer will be preferred during the reading process; the tip is required to travel across the polymer surface and the surface must be sufficiently hard and smooth to minimize the wear on the tip and damage to the surface. Finding a material with these properties is problematic since one feature normally precludes the other.

Linear polymers such as PMMA have been found to have suitable writing temperatures and the force required on the tip to form the pit is acceptably low for the required tip performance and power consumption; however, the wear rate on reading has been found to be unacceptably high because of the softness of the surface. Crosslinking of these polymers leads to a toughening of the surface and an improved tip wear rate during reading but requires a consequent increase in writing temperate and force leading to increased tip wear during the writing phase.

The present invention seeks to overcome these problems by using a class of polymers which under controlled conditions have the characteristics of linear polymers and are thus suitable for the writing phase but have the characteristics of crosslinked polymers during the conditions of the reading phase.

SUMMARY OF THE INVENTION

In a exemplary embodiment, a data storage system includes a read/write head having a tip connected to a resistive path locally exerting heat at the tip when an electrical current is applied; and a data storage medium from which information is reproduced by scanning a surface of the medium with a tip positioned in contact therewith, the medium comprising: a substrate; and a polymer recording surface within which data bit values are determined by the topographical state at the bit location, characterized in that the polymer contains thermally reversible crosslinkages.

In another embodiment, a data storage system includes a read/write head having a tip connected to a resistive path locally exerting heat at the tip when an electrical current is applied; and a multilevel data storage medium from which information is reproduced by scanning a surface of the medium with a tip positioned in contact therewith, the medium comprising: a substrate having a layered structure thereon within which data bit values are determined by the topographical state at the bit location characterized by: an outer layer of polymer having a first concentration of crosslinkages; and an inner layer of polymer disposed between the substrate and the outer polymer layer, the inner polymer layer having a concentration of crosslinkages greater that the concentration in the outer layer, wherein the bit value has a first value if the outer layer is penetrated and a second value if outer and inner layers are both penetrated.

In another embodiment, a data storage system includes a read/write head having a tip connected to a resistive path locally exerting heat at the tip when an electrical current is applied; and a multilevel data storage medium from which information is reproduced by scanning a surface of the medium with a tip positioned in contact therewith, the medium comprising: a substrate having a layered structure thereon within which data bit values are determined by the topographical state at the bit location characterized by: an outer layer of polymer having thermally reversible crosslinkages; and an inner layer of polymer disposed between the substrate and the outer polymer layer, the inner polymer layer having thermally reversible crosslinkages with a greater temperature Tr at which crosslinkage cleavage occurs than in the outer layer wherein the bit value has a first value if the outer layer is penetrated and a second value if outer and inner layers are both penetrated.

BRIEF DESCRIPTION OF THE DRAWINGS

Embodiments of the invention will now be described, by way of example, with reference to the accompanying drawings in which.

DETAILED DESCRIPTION

Figure 1A:
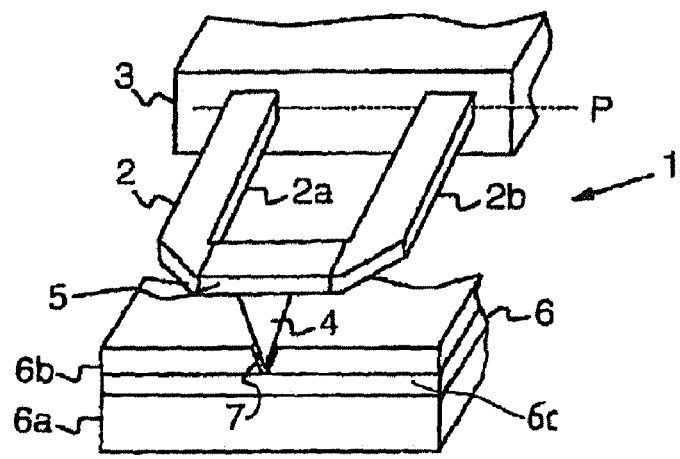
FIGS. 1a to 1c illustrate the construction and operation of a read/write component for a data storage device including the data storage medium of the present invention.

The present invention provides a data storage medium from which information is reproduced by scanning a surface of the medium with a tip positioned in contact therewith, the medium including a substrate; and a polymer recording surface within which data bit values are determined by the topographical state at the bit location. The polymer contains thermally reversible crosslinkages.

Crosslinking between polymer chains can be effected in a number of ways. Crosslinks may be achieved by having pendant groups on the polymer chains which may be linked directly or via linking agents. The crosslinks of the present invention must be capable of being severed upon heating and must reform spontaneously upon cooling the polymeric material. The crosslinks connect different polymer chains or may connect within individual polymer chains.

The polymer recording surface is preferably an organic polymer recording surface. The thermally reversible crosslinkages are preferably based on covalent bonds.

Suitable crosslinked polymers having covalent crosslinks that may be cleaved thermally are organic polymers comprising polymer chains which are connected one to another with Diels-Alder adducts.

A Diels-Alder adduct of formula (Structure I in the Appendix):wherein $X^1$ and $X^2$ may be the same or different and are electron attracting substituents, $R^1$ is hydrogen, $R^2$ is hydrogen, $Y^1$ and $Y^2$ may be the same or different and are hydrogen, alkyl or substituted alkyl, is formed by the reaction of a diene of formula (Structure II in the Appendix) wherein $X^1$ and $X^2$ are as hereinbefore defined, and a dienophile of formula (Structure III in the Appendix) wherein $R^1$, $R^2$, $Y^1$ and $Y^2$ are as hereinbefore defined. The diene and dienophile, and the adduct produced therefrom are suitably attached directly or indirectly to the polymer backbone by at least one of $X^1$ and $X^2$, and $R^1$, $R^2$, $Y^1$ and $Y^2$ respectively.

The Diels-Alder reaction is reversible and the rate of reaction between the diene and the dienophile to form the adduct, and the rate of the reverse reaction may be controlled by appropriate selection of the diene and dienophile and the substituents $X^1$ and $X^2$, and $R^1$, $R^2$, $Y^1$ and $Y^2$ attached thereto.

Crosslinked resins comprising polymer chains connected to one another by Diels-Alder adducts are known from, for example, U.S. Pat. No. 5,641,856 in the name of Shell Oil Company and U.S. Pat. No. 6,271,335 in the name of Sandia Corporation.

One advantage of using thermally reversible crosslinked materials, such as for example those based on Diels-Alder chemistry is that because the crosslinks are thermally reversible, as a result the material undergoes a dramatic change from a tough crosslinked solid to a soft, viscous melt of lower molecular weight fragments as the temperature is raised above the critical temperature at which the reverse Diels-Alder reaction occurs.

The writing mechanism of these polymers appears to be different from that observed for the polymers of the prior art. The polymers of the prior art are written using a 'squashing-type' mechanism where material is compacted but no significant molecular diffusion occurs; large rims around the indentations are formed. The much lower viscosity of the thermally reversed, non-crosslinked polymers of the present invention leads to significant diffusion of the molecules during writing and as a result the rim around the indentation does not form to the same extent; the overall dimension of the indentation is significantly decreased. An overall decrease in indentation dimension leads to both a higher signal to noise ratio giving less noise and more reliable data storage, and also increased storage capacity because the pits/indentations can be packed closer together.

A further advantage is the potential to tailor the reactivity of the Diels-Alder materials to light of specified wavelength thereby allowing the flexibility of intentionally modifying the storage medium with light in addition to heat.

One particular class of Diels-Alder crosslinked polymers suitable for use in the present invention is the group of polymers having Diels-Alder adducts formed from a dienophile and a substituted furan.

Suitable furans include those of formula (Structure IV in the Appendix) wherein $R^3$ represents hydrogen or an alkyl group and R4 represents a functional group linking to a polymer chain.

Preferably $R^3$ represents hydrogen or a methyl group. Preferred furans within formula (Structure IV in the Appendix) are the polymeric materials of formula (Structure V in the Appendix) wherein n and m represent the number of oligomeric units in the polymer chain.

Preferred dienophiles for use in the present invention are derivatives of maleimide. Suitable maleimides include those of formula (Structure VI in the Appendix) wherein $R^5$ represents a functional group linking to a polymer chain. Preferred maleimides within formula (Structure VI in the Appendix) are the polymeric materials of formula (Structure VII in the Appendix) wherein n and m represent the number of oligomeric units in the polymer chain.

The Diels-Alder adduct formed by the reaction of the furan of formula (Structure V in the Appendix) and the maleimide of formula (Structure VII in the Appendix) may be represented by formula (Structure VIII in the Appendix) wherein n and m are as defined above. The Diels-Alder adduct of formula (Structure VIII in the Appendix) is a tough highly crosslinked polymer which cleaves to form the furan (Structure V in the Appendix) and maleimide (Structure VI in the Appendix) at temperatures greater than 140° C. The mixture of furan (Structure V in the Appendix) and maleimide (Structure VI in the Appendix) is a soft material with viscous fluid properties. At temperatures below about 130° C. the Diels-Alder adducts reform to produce the tough highly crosslinked polymer. For use in the storage media of the present invention the polymer of formula (Structure VIII in the Appendix) would require a write-temperature in excess of 140° C. The read temperature for the polymer (Structure VIII in the Appendix) would be set at a temperature sufficiently below the write temperature to ensure pits were not inadvertently formed or erased.

In an alternative embodiment the polymer is a silicone derivative. The furan of formula (Structure IX in the Appendix) wherein $R^6$ is alkyl or cycloalkyl, may be reacted with a maleimide of formula (Structure X in the Appendix) wherein $R^7$ represents —$CH_2$—, —$CH_2CH_2$—, or 1,4-phenylene to produce a crosslinked network polymer. The degree of crosslinking may be controlled by adding furan to the reaction mixture as a chain length inhibitor. Preferably $R^6$ is cyclohexyl. Preferably $R^7$ is 1,4-phenylene.

The crosslinked network may be represented by formula (Structure XI in the Appendix) wherein $R^6$ and $R^7$ are as hereinbefore defined.

The properties of the crosslinked polymeric material are chosen such that the material can be spin-cast onto the substrate to give a uniform thickness of film at the desired thickness. One suitable method of spin coating requires the polymeric material to be spin coated onto the substrate in an uncrosslinked state—this may be done by using a temperature above which the cross links are broken.

In an alternative preferred method, the spin coating may be done at a lower temperature using a diene and/or dienophile precursor which is converted to the diene and/or dienophile after the spin coating. Suitable precursors of the dienophile include protected dienophiles. A multifunctional diene as described above and a protected multifunctional dienophile are mixed and spin coated onto the substrate to give a thin polymer film of the desired thickness. It is preferable to use a protected, multifunctional dienophile since this allows a stable mixture of the two components to be prepared which in turn allows thin films of reproducible thickness to be obtained. Heating of the thin film of polymer then leads to deprotection of the dienophile which undergoes reaction with the multifunctional diene via Diels Alder chemistry to give a highly crosslinked thin film. Such a highly crosslinked film is tough and resistant to wear at temperatures below the reverse Diels Alder reaction temperature; however, above this critical temperature the reverse Diels Alder reaction occurs to break the crosslinks and the original precursor molecules are obtained. Since these original precursor molecules are lower molecular weight, non-crosslinked materials, the thin films becomes very soft and writing is much easier than for a similar thin film composed on non-reversible crosslinks. The multifunctional diene and dienophile may be small organic molecules, they may also be functionalized linear chains, branched polymers, block copolymers, dendrimers, hyperbranched macromolecules or mixtures thereof.

The transition temperature between the crosslinked state and the uncrosslinked state, which may be written as Tr, may also be referred to as the crosslinkage cleavage temperature. The transition temperature between the crosslinked and the uncrosslinked material described above may be readily determined for any crosslinked polymer by experimentation. For example, the transition temperature for the polymer of formula (Structure VIII in the Appendix) is between about 130° C. and 140° C., the transition temperature for the polymer of formula (Structure XI in the Appendix) wherein $R^6$ is cycloalkyl. and $R^7$ is 1,4-phenylene is about 120° C.

The class of crosslinked polymers described above which are connected one to another with Diels-Alder adducts is one example of suitable polymeric materials for use in the present invention. Any class of crosslinked polymer in which the crosslinks may be cleaved thermally are suitable for use in the present invention subject to the proviso that the cleavage temperature is within the working temperature range of the read/write tip. The crosslinked polymers described above contain covalent thermally reversible crosslinks. In an alternative embodiment the crosslinkages are suitably non-covalent bonds.

In a preferred alternative embodiment the crosslinkages are hydrogen bonds (H-bonding). One advantage for the use of non-covalent crosslinkages such as hydrogen bonds is the potential to tailor the strength of the crosslinking by changing the number and nature of the non-covalent interactions. If H-bonding is used, crosslinks may involve individual H-bonds or quadruple H-bonds which have a significantly higher dissociation temperature than the materials formed from individual H-bonds thereby modifying the operating parameters of the storage medium. One suitable example of a quadruple H-bonding system is shown in Reaction Scheme 1.

The crosslinked polymer of formula (Structure XII in the Appendix), wherein P is the polymer backbone and R is hydrogen or an alkyl group is suitably formed by dissolving a linear polymer of formula (Structure XIII in the Appendix) containing the H-bonding crosslinking units in a polar solvent which is chosen for its H-bonding character and ability to disrupt the H-bonding between the crosslinking units. This solution is then spin-cast onto an appropriate substrate such as those described above to give a thin medium of the desired thickness. The solvent is evaporated and as the solvent is removed the H-bonding units along the polymeric backbone start to form crosslinks leading to formation of a crosslinked polymer (Structure XII in the Appendix).

The highly crosslinked polymer (Structure XII in the Appendix) is tough and resistant to wear at temperatures below the temperature at which the H-bonds break.

Reaction Scheme 1

For quadruple H-bonding units the temperature at which the crosslinks are cleaved is about 80 to 100° C. Above this critical temperature the H-bonding units break removing the crosslinks and the original precursor molecules are obtained.

The precursor molecules are lower molecular weight, non-crosslinked materials, and as for the covalent thermally reversible crosslinked materials described above, the thin films becomes very soft and writing is much easier than for a similar thin film composed on non-reversible crosslinks. The H-bonding units may be small organic molecules, functionalized linear chains, branched polymers, block copolymers, dendrimers, hyperbranched macromolecules or mixtures thereof.

The thickness of the polymer layer is suitably in the range 2 to 200 nm, more suitably 5 to 100 nm, most suitably 10 to 50 nm, with a thickness of about 25 nm being preferred.

The substrate upon which the polymer layer or layers is deposited is most suitably silicon. Silicon is particularly suitable as a substrate because of its thermal properties, it can be made very flat and can be micromachined; however, it is a hard material and can cause damage to the tip if there is contact between the tip and the substrate during writing data. The presence of a layer of material immediately adjacent to the substrate to act as a penetration stop to prevent contact between the tip and the substrate reduces tip wear. Suitable materials for use as the penetration stop layer include crosslinked photoresists which when hard baked have low surface roughness combined with softness and good thermal stability.

In the prior art, data is stored using a binary code. The storage density can be significantly increased if the depth of the indent is also used to carry information. Accordingly the present invention further provides a data storage medium from which information is reproduced by scanning a surface of the medium with a tip positioned in contact therewith, the medium comprising a substrate and a polymer recording surface within which data bit values are determined by the topographical state at the indentation location, wherein the data value is a function of the depth of the indention at the indention location. For example, the absence of indentation could represent a "0", a 5 nm indentation a "1", an indention of twice the depth (a 10 nm indentation) a "2" and an indentation of three times the depth (a 15 nm indentation) a "3", thus encoding multiple bits of information in each indentation.

In order to maintain a similar signal-to-noise/interference-ratio in such a multilevel storage scheme the maximum depth of the indentations will be larger than in the binary scheme. In general, this means that the lateral dimensions of the indentation will also increase resulting in a decrease in the maximum density of indentations per unit area of the data recording medium surface.

The depth of an indentation depends directly upon the writing conditions. Pits with different depth can be achieved by adjusting the writing parameters. The depth of the indentation representing the information may be controlled by adjusting one or more of the following parameters: the writing temperature; the tip load force; the length of the heat pulse; and the length of the load force pulse. The writing temperature is adjusted by varying the temperature of the tip during the write event with the result that the higher the temperature of the tip the deeper the indentation formed. The tip load force may be adjusted to give a deeper indentation with increasing tip load force. The length of the heat pulse may be adjusted with the result that the longer the time of applying the heat the deeper will be the indentation. The length of the load force pulse may be adjusted to control the time of applying the load with the depth of the indentation increasing with increasing load force. Multilevel recording may be achieved by selecting writing parameters that create an indentation with the selected depth representing the bit level.

The information which can be stored using the depth of an indentation is limited by unwanted variation in the depth of the indentations resulting from variations in the writing conditions. Such variations in the depth can be reduced by using a layered storage medium which makes the depth of the indent less dependent on the writing parameters.

In a preferred embodiment of the present invention, the data storage medium is one wherein the polymer recording surface is one of a plurality of such surfaces formed in a layer structure upon the substrate. Preferably the polymer recording surface is an organic polymer.

In a further preferred embodiment the concentration of crosslinkages increases from a minimum level at the outer surface to a maximum level at the surface in contact with the substrate. The concentration of cross linkages may vary linearly or may be stepped. One suitable method for achieving the gradient in crosslink density in an organic polymer comprises doping the polymer layer with a photoacid or photobase generator and a dye. The concentration and nature of the dye is chosen such that on irradiation the intensity of light goes from 100% at the top of the layer to about 0% at the base of the layer. The acid or base is generated in a gradient profile through the film and the acid or base is then used to control a crosslinking reaction such that at the top where acid (or base) is produced, little or no crosslinking reaction occurs, at the bottom where no acid (or base) is produced 100% crosslinking is obtained.

In a further embodiment the present invention provides a multilevel data storage medium from which information is reproduced by scanning a surface of the medium with a tip positioned in contact therewith, the medium comprising a substrate having a layered structure thereon within which data bit values are determined by the topographical state at the bit location comprising; an outer layer of polymer having a first concentration of crosslinkages; and an inner layer of polymer disposed between the substrate and the outer polymer layer, the inner polymer layer having a concentration of crosslinkages greater that the concentration in the outer layer, wherein the data value has a first value if the outer layer is penetrated and a second value if outer and inner layers are both penetrated.

In order to achieve the desired writing conditions of each layer the polymer materials may be chosen such that the different layers have different glass transition temperatures Tg. (Tg of layer 1 is lower than Tg of layer two, lower than Tg of layer 3 and so on.) This can be done by choosing polymer of different chemical compositions. Preferably the polymer is an organic polymeric material The writing temperature of the polymer layer depends approximately linearly on the glass transition temperature. One method of changing the glass transition temperature is to change the degree crosslinking within the polymer layer. This can be done for example with different types of crosslinked photoresist, such as for example, SU8 resin from MicroChem Corporation, Newton, Mass., USA, mixed with varying amounts of non-cross-linking monomers. Also a series of normal linear polymers can be used with varying concentrations of crosslinking groups along the backbone. For example, a tri-layer device can be prepared by initially spin coating a thin layer (ca. 10 nm) of polystyrene containing 30 mol % of a crosslinking benzocyclobutene group (BCB) followed by curing to 250 C for 1 hour to cause crosslinking. Subsequently, a second thin layer is applied by spin coating (ca. 10 nm) on top of this initial layer using a different polystyrene derivative, in this case containing 15 mol % of the crosslinking BCB group. This two level structure is then cured at 250 C for 1 hour to effect crosslinking of the second layer. Finally a third polymeric layer is applied by spin coating, again 10 nm in thickness using a polystyrene layer with an even lower degree of BCB incorporation, in this example 5 mol %. Finally curing at 250 C for 1 hour then gives the desired multilevel structure with discrete changes in physical properties on going from the bottom to the top. It should however be realized that, while the previous example concerns a tri-layer structure of equal thickness, this is not necessary and in some cases it may be beneficial to have a non-symmetrical structure with layers of varying thickness.

A preferred layer structure for use in the multilevel system is one in which at least the one layer comprises a reversible crosslinked polymer. More preferably there are multiple layers of reversible crosslinked polymer, each layer designed to undergo a reversible crosslinking reaction at a different temperature. Alternatively, it would also be possible to have a multi-layer structure composed of different materials/crosslinking concepts—for example the top layer could be based on a Diels-Alder polymer and the bottom two layers on crosslinkable linear polymers or crosslinked photoresist, such as for example, SU8 resin from MicroChem Corporation, Newton, Mass., USA. Where a Diels-Alder polymer is used the reference above to the glass transition temperature Tg for the polymer is replaced by Tr, the crosslink cleavage temperature.

In a yet a further embodiment the present invention provides a data storage medium comprising a substrate having a layered structure thereon within which data bit values are determined by the topographical state at the indentation location. The medium comprises an outer layer of polymer, preferably organic polymer, having thermally reversible crosslinkages; and an inner layer of polymer, preferably organic polymer, disposed between the substrate and the outer polymer layer. The inner polymer layer has thermally reversible crosslinkages with a greater temperature Tr at which crosslinkage cleavage occurs than in the outer layer. The bit value has a first value if the outer layer is penetrated and a second value if outer and inner layers are both penetrated.

As described above for the prior art data storage media, data is stored by making pits/indentations in a thin polymer film using a cantilever with a tip. The tip is preferably conical in shape. The pit/indentation is created by heating the tip and pressing it into the polymer. If sufficient heat is transferred to raise the temperature of the polymer above a certain temperature (which is dependent on the chosen polymer), the polymer softens and the tip sinks in, creating an indentation or bit.

A multilevel data storage medium of the present invention suitably comprises at least two data storage layers. The two organic polymer data storage layers each have an organic polymer recording surface. A point on the outer recording surface where there is no pit may represent a data bit of zero. A pit with a penetration of a single layer may represent a "1", and a pit penetrating two layers may represent a "2". The depths of the pits may be for example 5 and 10 nm respectively corresponding the a layer thickness for each data recording layer of 5 nm.

Considering the depth of a pit as a function of a writing parameter, no indent appears if the parameter is smaller than a certain threshold level 1. Once the threshold level 1 is passed, the depth of an indent starting on the tip surface will increase until the tip hits the second layer. The material of the second layer can be chosen to have a higher threshold value of the writing parameter. This can be done again for a third or more layers.

The present invention also provides a data storage system comprising a read/write head having a tip connected to a resistive path locally exerting heat at the tip when an electrical current is applied; and a data storage medium as described hereinbefore. Most suitably a plurality of such read/write heads are arranged in the form of at least one array and the data storage medium has storage areas matching the form of the one or more read/write head arrays. The storage medium may be arranged to be rotated and the read/write head array correspondingly fixed and having a form adapted to circular geometry.

The process for writing data to a data storage medium of the present invention comprises arranging a heat emitting tip connected to a resistive path in contact with the data storage medium, and driving a current through the resistive path which causes heating of the tip to a predetermined minimum data writing temperature thereby causing local softening of the organic polymer recording surface allowing penetration of the read/write tip to form a pit. The data is suitably stored in a binary code and the absence of a pit on the organic polymer recording surface represents a zero data bit and the presence of a pit represents a 1 data bit. Alternatively, the depth of penetration of the tip may represent additional data The process for reading data from a data storage medium of the present invention comprises arranging a heat emitting tip connected to a resistive path, in contact with the data storage medium, and driving a current through the resistive path thereby heating the tip to a predetermined maximum temperature and determining the thermal conductance between the storage medium and the resistive path.

Figures 1B, 1C:
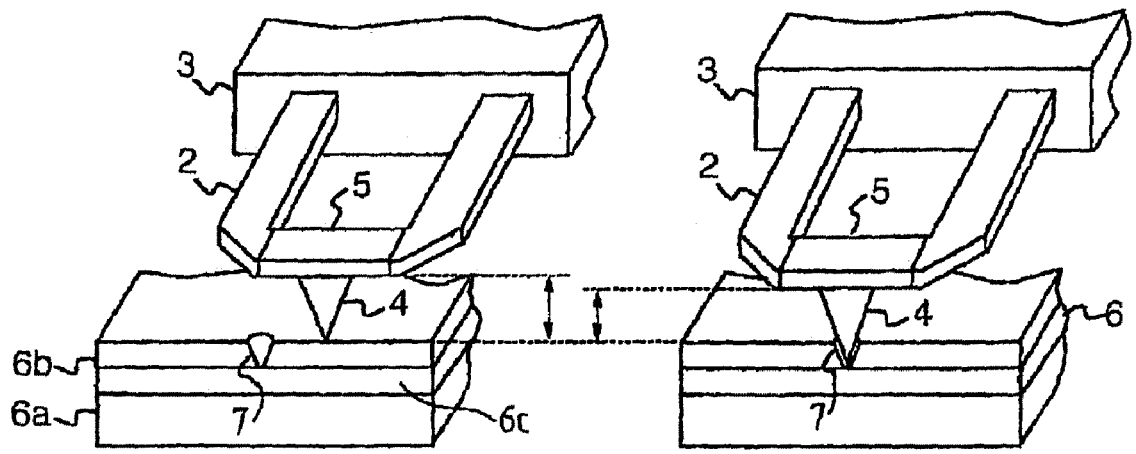

A read/write component 1 of an AFM-based data storage device is shown schematically in FIGS. 1a to 1c of the accompanying drawings. The component 1 comprises a generally U-shaped cantilever 2 which is connected to a support structure 3 (only partially shown in the figures). Flexing of the legs 2a, 2b of the cantilever 2 provides for substantially pivotal movement of the cantilever about a pivot axis P. The read/write tip 4 is provided on a heater 5 which forms a platform at the end of the cantilever 2. The highly-doped silicon cantilever legs 2a, 2b define a current path connecting the heater platform 5 between a pair of electrical supply lines (not shown) on the support structure 3.

In operation, the read/write tip 4 is biased against the surface of the data storage medium of the present invention indicated schematically at 6 and shown here in cross-section. The storage medium comprises a substrate 6a and a polymer surface layer 6b. Also shown in FIGS. 1a to 1c is an optional penetration stop layer 6c.

In the write mode, the heater platform 5 can be heated to a writing temperature $T_w$ by application of a write-mode potential across the supply lines. The consequent heating of the tip 4 results in heat transfer to the polymer surface layer 6a causing local softening of the polymer. This allows the tip 4 to penetrate the surface layer to form a pit, or bit indentation, 7 as shown in FIG. 1a. Such a pit represents a bit of value "1", a bit of value "0" being represented by the absence of a pit. The storage medium 6 can be moved relative to read/write component 1 allowing the tip to write data over an area of the surface, or "storage field", corresponding to the field of movement.

The process of reading data from the storage medium involves sensing the height of the tip with respect to a predetermined reference level. This may be accomplished by mechanically connecting a heat emitting resistive path to the tip, driving a current through the resistive path to a predetermined temperature and determining the thermal conductance between the resistive path and the storage medium. The thermal conductance between the resistive path and the storage medium is a function of the distance between the heat emitting path and the surface of the storage medium.

In the illustrated example, in the read mode, the heater platform 5 is used as a thermal sensor by exploiting its temperature-dependent resistance. A read-mode potential is applied across the supply lines to heat the heater to a reading temperature $T_R$ which is less than the writing temperature $T_W$ and not high enough to cause softening of the polymer. As the storage field is scanned by the tip 4, the pivotal position of the cantilever 2 at each bit position differs according to the presence or absence of a pit 7. In the absence of a pit, as shown in FIG. 1b, the distance between the heater platform 5 and storage medium 6 is greater than the corresponding distance when a pit is present, and the tip enters the pit, as shown in FIG. 1c. Heat transport across the air gap between the heater 5 and storage medium 6 is thus more efficient when a pit is present at a bit position, and since more heat is then lost to the storage medium, the temperature of the heater 5, and hence its resistance, will be reduced. Thus, as the storage field is scanned, the data bits are detected by monitoring changes in the temperature of the heater 5, in practice by monitoring changes in the voltage across a series resistor in one of the supply lines.

While the operation of a single read/write component 1 has been explained above, in practice an array of such components is employed to produce a data storage device as described in the article referenced earlier.

Figure 2:
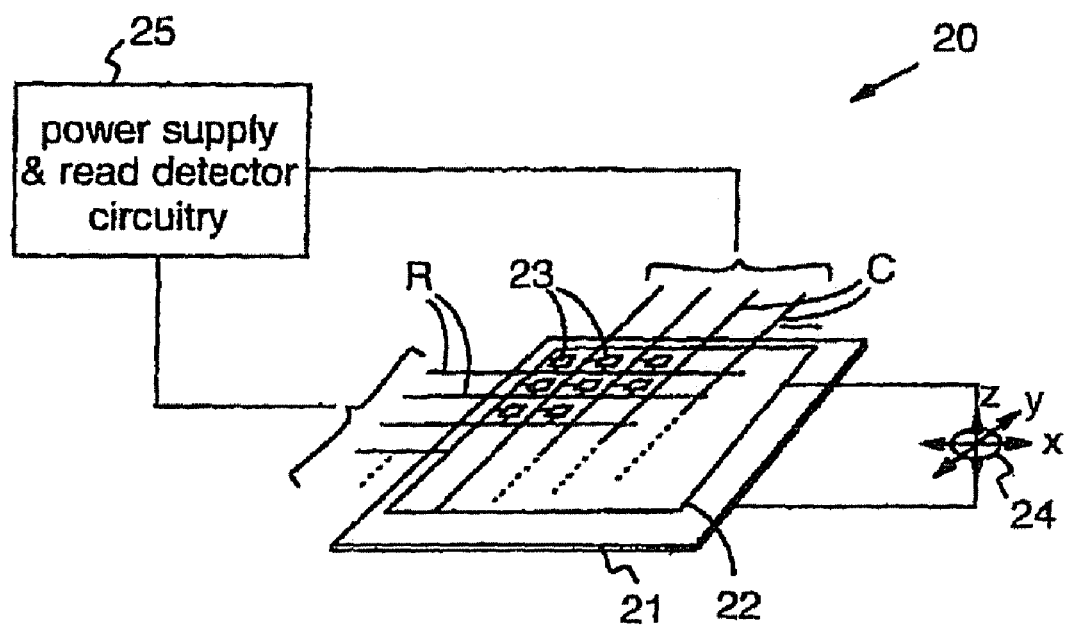
FIG. 2 is a schematic representation of a data storage device in which the data storage medium embodying the invention can be employed.

FIG. 2 depicts a data storage device 20 including a data storage medium 21 and a read/write apparatus as described above in the form of an array 22 of read/write components 23. It is to be appreciated, however, that these components may include additional circuitry, such as amplifiers etc., where required. Each read/write component 23 is connected to two supply lines, a row supply line R and a column supply line C, as indicated schematically in the figure. All components 23 in the same row of the array share the same row supply line R. Similarly, all components in the same column of the array share the same column supply line C. Drive means, indicated schematically at 24, enables the relative movement of the array and storage medium, whereby the array can be accurately located in its operating position against the storage medium and, during operation, each component 23 can scan its individual storage field as described earlier.

The row and column lines R, C of array 22 are connected to power supply and read detection circuitry indicated generally at 25. Circuitry 25 operates to supply power to the components of the array 22, the individual components 23 being addressed by their row and column lines in known manner via row and column multiplexers (not shown) of circuitry 25. Each component 23 can be addressed in both a write mode and a read mode, the power supply circuitry supplying a write mode signal via the supply lines in the write mode, and a read mode signal via the supply lines in the read mode. The read detector circuitry of block 25 operates in the read mode to detect the bit values indicated by the read-sensing mechanisms of components 23. In general, this read detection can be performed in various ways as will be apparent to those skilled in the art. In the particular embodiments described hereinafter, however, the read detection is conveniently performed as in prior systems by measuring the voltage across series resistors connected in the column lines C of array 22.

The data storage medium 21 comprises a silicon substrate having a thin layer of the polymer of the present invention spin coated thereon. The data is written on and read from the storage medium as described in relation to FIG. 1 above.

Figure 3:
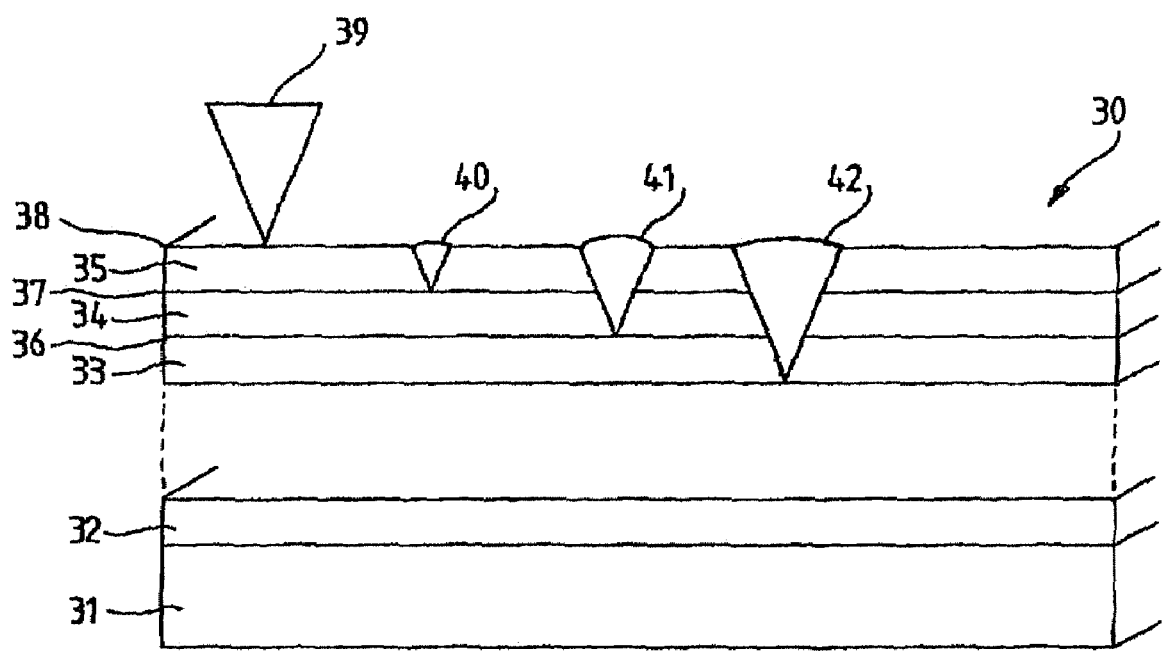
FIG. 3 is a schematic cross sectional representation of a multilevel data storage medium of the present invention.

FIG. 3 depicts a multilevel data storage medium of the present invention in which there are three data storage layers shown in cross section. The data storage medium 30 comprises a silicon substrate 31 covered by a penetration stop layer 32. The organic polymer data storage layers 33, 34 and 35 have respectively organic polymer recording surfaces 36, 37, 38. Read/write tip 39 is depicted having a conical shape and is shown in a position in contact with the outer surface of the data storage medium at a point where there is no pit; the absence of a pit represents a data bit of zero. Pit 40 is shown with a penetration of the single layer 35, pit 41 shows a penetration of two layers 35 and 34, and pit 42 shows a penetration of three layers 35, 34, and 33. The respective depths of the pits may represent information such as for example, pit 40 may represent a "1", pit 41 may represent a "2", and pit 42 may represent a "3"; such a scheme enables each pit to represent two bits of information. The depths of pits 40, 41 and 42 may be for example 5, 10, and 15 nm respectively corresponding the a layer thickness for each data recording layer of 5 nm.

Figure 4:
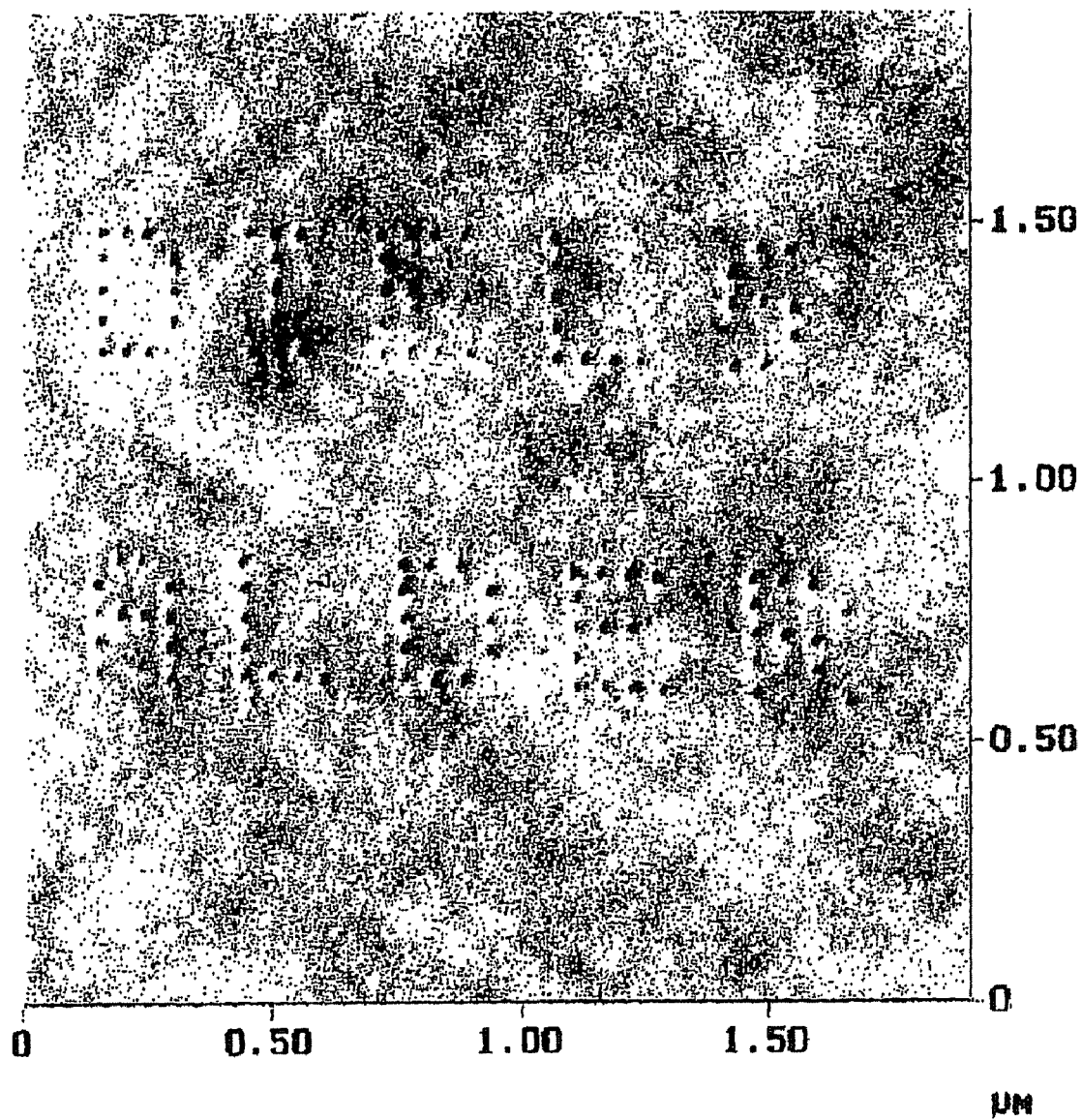
FIG. 4 is a Scanning Force Microscopy image of a data storage medium of the present invention.

FIG. 4 is an Atomic Force Microscope image of a data storage medium of the present invention. The pits appear as dark areas on the otherwise gray background which is the recording surface of the polymer. The bit pitch on the recording surface is 60 nm giving a bit density of about 200 Gigabits per square inch. The polymer and polymer film used to obtain the image were prepared as described in the following examples.

The following examples illustrate the preparation and use of organic polymers and their precursors for use in the recording surfaces of the present invention:

General Methods: Commercial reagents were obtained from Aldrich and used without further purification. Analytical TLC was performed on commercial Merck plates coated with silica gel GF254 (0.24 mm thick). Silica gel for flash chromatography was Merck Kieselgel 60 (230-400 mesh, ASTM). Nuclear magnetic resonance was performed on a Bruker AVANCE 400 FT-NMR spectrometer using deuterated solvents and the solvent peak as a reference. Gel permeation chromatography was performed in tetrahydrofuran (THF) on a Waters chromatograph equipped with four 5-mm Waters columns (300.times.7.7 mm) connected in series with increasing pore size (100, 1000, 100,000, 1,000,000 Å). A Waters 410 differential refractometer and a 996 photodiode array detector were employed. The polystyrene molecular weights were calculated relative to linear polystyrene standards, whereas the poly(n-butyl acrylate) molecular weights were calculated relative to poly(n-butyl acrylate) standards.

EXAMPLE 1

Synthesis of Tris(furfuryloxy)cyclohexylsilane

To a 1000 ml flask was added 100 ml dry of Toluene, furfuryl alcohol (70.00 g, 718 mmol) and triethylamine (75.35 g, 746 mmol) was added dropwise a solution of cyclohexyltrichlorosilane (49.2 g, 226 mmol) in dry toluene (150 ml). The reaction mixture was then stirred overnight at room temperature and the heavy suspension was then stirred with diethyl ether (500 ml) and filtered. The precipitate was then triturated with diethyl ether (500 ml) and the combined organic layers dried and evaporated to dryness. The crude product was purified by distillation (169-173 C at 500 mTorr) to afford the tris(furan), 1, as a light yellow oil (83.9 g, 92%). $^{1}$H-NMR (400 MHz, CDCl$_3$) d: 7.40 (m, 3H, ArH), 6.33 (m, 3H, ArH), 6.24 (m, 3H, ArH), 4.72 (s, 6H, OCH$_2$), 1.82-1.88 (m, 4H, CH$_2$), 1.65-1.70 (m, 6H, CH$_2$), and 0.85 (t, 1H, CH); $^{13}$C-NMR (100 MHz, CDCl$_3$) d: 153.5, 142.4, 110.0, 107.8, 57.4, 27.6, 26.6, 26.4, 22.9.

EXAMPLE 2

Bis Furan Protected Derivative of 1,1(Methylenedi-4,1-phenylene)bismaleimide

The bismaleimide (45.45 g, 127 mmol) was dissolved in tetrahydrofuran (100 ml) and furan (51.80 g, 762 mmol) was added dropwise. The reaction mixture was then heated at reflux under nitrogen for 6 hours and then left to stir at room temperature overnight followed by evaporation to dryness. The crude product was purified by filtration through silica to give the bis(furan) protected derivative, 2, as a white solid (55.0 g, 88%); $^{1}$H-NMR (400 MHz, CDCl$_3$) d: 7.12 and 7.26 (ABq, 8H, J=7.4 Hz, ArH), 6.49 (s, 4H, Alkene-CH), 5.50 (s, 4H, CH—O), 3.96 (s, 2H, CH$_2$), and 2.94 (s, 4H, CH).

EXAMPLE 3

Bis 2-Methylfuran Protected Derivative of 7,7-dihexyl-1,14-(bismaleimide)tetradecane The bismaleimide (Loctite) (5.00 g, 7.9 mmol) was dissolved in tetrahydrofuran (30 ml) and 2-methylfuran (1.30 g, 15.8 mmol) was added dropwise. The reaction mixture was then heated at reflux under nitrogen for 18 hours and evaporated to dryness. The crude product was purified by filtration through silica to give the bis(2-methylfuran) protected derivative, 3, as a clear oil (4.50 g, 70%); $^{1}$H-NMR (400 MHz, CDCl$_3$) d: 6.58 (d, 2H, J=1.4 Hz, Alkene CH), 6.58 (d, 2H, J=1.1 Hz, Alkene CH), 5.05 (s, 2H, CH—O), 3.43 (t, 4H, N—CH$_2$), 2.82 and 3.01 (each d, 2H, CH), 1.72 (s, 6H, furan-CH$_3$), 1.30-1.65 (m, 36H, CH$_2$), and 0.90 (t, 6H, CH$_3$).

EXAMPLE 4

Formulation of Prepolymer (B-Staging Via In-situ Protection)

1,1-(Methylenedi-4,1-phenylene)bismaleimide (6.65 g, 18.6 mmol) was dissolved in NMP (20 ml), tris(furfuryloxy)cyclohexylsilane, 1 (5.00 g, 12.4 mmol) and furan (1.68 g, 24.8 mmol) were then added and the reaction mixture stirred at room temperature for 48 hours. Excess furan (8.41 g, 124 mmol) was then added followed by stirring at room temperature for 24 hours to protect all of the remaining maleimide groups. The reaction mixture was then precipitated (2.times.) into hexane (500 ml) to give the B-staged Diels Alder polymer, 4, (11.5 g, 86%). The molecular weight, viscosity and spinning characteristics of the B-staged polymer could be controlled by the ratio of bis(maleimide):tris(furan): furan in the original reaction mixture. $^{1}$H-NMR (400 MHz, CDCl$_3$) d: 7.54-6.30 (m, ArH and alkene CH), 4.60-3.00 (br m, CH$_2$ and CH), and 1.05-2.20 (m, CH$_2$).

EXAMPLE 5

Formulation of Prepolymer (B-Staging Via Protected Monomers), 5

A mixture of the bis(furan) protected bismaleimide, 2, (9.34 g, 18.6 mmol) and the tris(furfuryloxy)cyclohexylsilane, 1 (5.00 g, 12.4 mmol) were dissolved in NMP (20 ml) and heated at 80 C for 12 hours. An excess of furan (8.41 g, 124 mmol) was then added followed by stirring at room temperature for 24 hours to protect all of the remaining deprotected maleimide groups. The reaction mixture was then precipitated (2×) into hexane (500 ml) to give the B-staged Diels Alder polymer, 5, (12.1 g, 90.5%). The molecular weight, viscosity and spinning characteristics of the B-staged polymer prepared by this alternate method could be controlled by the ratio of bis(maleimide):tris(furan): furan in the original reaction mixture, the reaction temperature and reaction time. $^{1}$H-NMR (400 MHz, CDCl$_3$) d: 7.54-6.30 (m, ArH and alkene CH), 4.60-3.00 (br m, CH$_2$ and CH), and 1.05-2.20 (m, CH$_2$).

EXAMPLE 6

Fabrication of Thin Crosslinked Films

The B-staged polymer, 4, (1.0 g) was dissolved in dry NMP (9.0 g) (10.0 wt % solution) and this solution was then filtered through a 0.1 mm filter and spun coated onto silicon wafers at 2500 rpm. The wafers were then heated at 120 C for 5 hours to cause full deprotection of the maleimide groups with associated loss of the furan protecting group and crosslinking. The resulting thin films, the thickness of which could be controlled by spin speed and initial wt %, were shown to be fully crosslinked and defect free, suitable for data storage using scanned probe techniques.

While the invention has been described with respect to certain preferred embodiments and exemplifications, it is not intended to limit the scope of the invention thereby, but solely by the claims appended hereto.

The invention claimed is:

1. A data storage system comprising:
   a read/write head having a tip connected to a resistive path locally exerting heat at the tip when an electrical current is applied; and
   a data storage medium from which information is reproduced by scanning a surface of the medium with a tip positioned in contact therewith, the medium comprising: a substrate; and a polymer recording surface within which data bit values are determined by the topographical state at the bit location, characterized in that the polymer contains thermally reversible crosslinkages.

2. The data storage system of claim 1, wherein the polymer recording surface is an organic polymer recording surface.

3. The data storage system of claim 2, wherein the thermally reversible crosslinkages are based on covalent bonds.

4. The data storage system of claim 3, wherein the thermally reversible crosslinkages are Diels-Alder adducts.

5. A data storage medium as claimed in claim 1 wherein the thermally reversible crosslinkages are based on non-covalent bonds.

6. The data storage system of claim 5, wherein the non-covalent thermally reversible crosslinkages are based on hydrogen bonds.

7. The data storage system of claim 1, wherein the polymer recording surface is one of a plurality of such surfaces formed in a layer structure upon the substrate.

8. The data storage system of claim 1, wherein the concentration of thermally reversible crosslinkages increases from a minimum level at the outer surface to a maximum level at the surface in contact with the substrate.

9. The data storage system of claim 8, wherein the concentration of thermally reversible cross linkages varies linearly.

10. The data storage system of claim 1, wherein the substrate is silicon.

11. The data storage system of claim 10, wherein the layer of material immediately adjacent to the substrate is a layer of polymer to act as a penetration stop to prevent contact between the tip and the substrate.

12. A data storage system comprising:
    a read/write head having a tip connected to a resistive path locally exerting heat at the tip when an electrical current is applied; and
    a multilevel data storage medium from which information is reproduced by scanning a surface of the medium with a tip positioned in contact therewith, the medium comprising: a substrate having a layered structure thereon within which data bit values are determined by the topographical state at the bit location characterized by: an outer layer of polymer having a first concentration of crosslinkages; and an inner layer of polymer disposed between the substrate and the outer polymer layer, the inner polymer layer having a concentration of crosslinkages greater that the concentration in the outer layer, wherein the bit value has a first value if the outer layer is penetrated and a second value if outer and inner layers are both penetrated.

13. The data storage system of claim 12, wherein the polymer is an organic polymer.

14. The data storage system of claim 12, wherein the crosslinkages in one or both of the polymer layers are thermally reversible crosslinkages.

15. A data storage system comprising:
    a read/write head having a tip connected to a resistive path locally exerting heat at the tip when an electrical current is applied; and
    a multilevel data storage medium from which information is reproduced by scanning a surface of the medium with a tip positioned in contact therewith, the medium comprising: a substrate having a layered structure thereon within which data bit values are determined by the topographical state at the bit location characterized by: an outer layer of polymer having thermally reversible crosslinkages; and an inner layer of polymer disposed between the substrate and the outer polymer layer, the inner polymer layer having thermally reversible crosslinkages with a greater temperature Tr at which crosslinkage cleavage occurs than in the outer layer wherein the bit value has a first value if the outer layer is penetrated and a second value if outer and inner layers are both penetrated.

16. The data storage system of claim 15, wherein the polymer is an organic polymer.

* * * * *